United States Patent [19]

Hültzsch et al.

[11] 4,013,605
[45] Mar. 22, 1977

[54] PHENOLIC RESINS FROM ALKYL SUBSTITUTED DIMETHYLOLPHENOLS

[75] Inventors: Kurt Hültzsch, Wiesbaden-Biebrich; Wolfgang Hesse, Wiesbaden; Hans-Dieter Mummenthey, Ingelheim, all of Germany

[73] Assignee: Hoechst Aktiengesellschaft, Frankfurt, Germany

[22] Filed: Dec. 8, 1970

[21] Appl. No.: 96,283

[52] U.S. Cl. .............................. 260/29.3; 260/32.4; 260/33.4 R; 260/838; 428/460; 428/524

[51] Int. Cl.$^2$ .................. C08L 61/06; C08L 61/08; C08L 61/12

[58] Field of Search ........ 260/29.3, 47, 838, 55–59

[56] References Cited

UNITED STATES PATENTS

| | | | |
|---|---|---|---|
| 3,026,586 | 3/1962 | Neuworth et al. | 260/57 C |
| 3,227,686 | 1/1966 | Fitko et al. | 260/57 X |
| 3,409,579 | 11/1968 | Robins | 260/57 |
| 3,448,001 | 6/1969 | Jarvi | 260/57 C X |
| 3,478,127 | 11/1969 | Petersen | 260/57 R X |
| 3,485,797 | 12/1969 | Robins | 260/57 |

OTHER PUBLICATIONS

Martin, The Chemistry of Phenolic Resins, N.Y., John Wiley & Sons, Inc., 1956, pp. 21, 258–259.
Martin, Ibid, pp. 6–20.

*Primary Examiner*—Howard E. Schain
*Attorney, Agent, or Firm*—Littlepage, Quaintance, Murphy & Dobyns

[57] ABSTRACT

A process for the preparation of a flexible phenolic resin which comprises co-condensing a dimethylol phenol, substituted by an alkyl group having from 1 to 20 carbon atoms, with a methylol derivative of a polyfunctional phenol in which derivative at least half of the reactive hydrogen atoms in the polyfunctional phenol are substituted by methylol groups and wherein the ratio of the methylol groups of the derivative of the polyfunctional phenol per mol of the dimethylolalkyl phenol is from 1.4:1 to 6:1, a phenolic resin prepared by said process, a coating composition containing said phenolic resin and an article coated with or comprising said phenolic resin.

13 Claims, No Drawings

PHENOLIC RESINS FROM ALKYL SUBSTITUTED DIMETHYLOLPHENOLS

This invention is concerned with improvements in or relating to phenolic resins.

For certain applications currently available phenolic resins are too brittle and it has been proposed that they should be plasticised by chemically incorporating non-phenolic compounds into such resins during their preparation. Thus there are described in the literature etherifications, esterifications and other reactions of phenolic resins with, for example fatty oils, fatty acids, naturally occurring and synthetic resins, terpenes, alcohols and rubber. It has also been proposed to flexibilize phenolic resins by incorporating therein polyphenols i.e. phenols having at least three phenolic OH-groups linked by flexible groups.

Modification of phenolic resins with non-phenolic materials reduces their phenolic character. Such modified resins and the cured products obtained therefrom tend to be more flexible than unmodified materials however the curing process is often slow and incomplete and there is frequently observed a reduction in the otherwise excellent chemical stability of the pure phenolic resins.

Phenols and formaldehyde may be condensed with one another in such a manner that flexible products are obtained even though additional materials possessing softening or flexible groups are not present in the reaction mixture. Thus, for example the condensation of heavily substituted alkyl phenols e.g. m-isopropyl phenol with formaldehyde was proposed. It is necessary to cure these resins by the action of heat and the resins produced are, like those derived from long-chained polyphenol compounds, suitable for use in the production of moulded articles. However, although these resins possess a measure of plasticity the surface protection that they confer is not adequate. In addition, the condensates have inadequate resistance to chemicals.

Alkyl phenols in which the alkyl group is of medium chain length, e.g. 8 to 18 carbon atoms, have been subjected to a mixed condensation with phenol and formaldehyde in the presence of acids, or bases such as alkali and ammonia, in an attempt to marshal the softening influence of the hydrocarbon chain of the alkyl phenols. The impact strength of fibres produced from such resins is not satisfactory for certain applications and it is necessary to store such condensates for 10–20 minutes at 190°–200° C to effect curing.

The invention provides a process for the preparation of a flexible phenolic resin which comprises condensing a dimethylol phenol, substituted by an alkyl group having from 1 to 20 carbon atoms, with a methylol derivative of a polyfunctional phenol in which derivative at least half of the reactive hydrogen atoms in the polyfunctional phenol are substituted by methylol groups and wherein the ratio of the methylol groups of the derivative of the polyfunctional phenol per mol of the dimethylol alkyl phenol is from 1.4:1 to 6:1.

The expression "polyfunctional phenol" as used herein means a phenol having at least 3 functional groups.

By the process according to the invention a condensate may be obtained in which the compounds containing methylol groups are randomly, i.e. statistically distributed and such materials possess improved mechanical stability. This is believed to be due to the cross-linking that occurs on curing rather than any softening action of the alkyl group. Additionally, the properties obtained appear to be substantially independent of the character of the alkyl group since the improved mechanical stability is obtained when dimethylol compounds of phenols with short (1 to 7 carbon atoms) or long (8 to 20 carbon atoms) are used.

It is preferred that the alkyl group of the dimethylol alkylphenol should be branched. Suitable dimethylol alkylphenols are derived from the following alkyl phenols, although the 2,6-dimethylol compounds are preferred; p-tert.-butyl phenol, p-cresol, nonyl phenol, p-octyl phenol, p-amyl phenol, 3,5-diisopropyl phenol and 3-methyl-5-isopropyl phenol are used. If the co-condensates are present in the composition according to the invention and in the mentioned quantitive proportions there is an additional plasticizing effect of the chain-length of the alkyl phenol as a side-effect.

The methylol derivative of a polyfunctional phenol may be a polymethylol derivative of the following phenols: phenol, m-cresol, 3,5-xylenol, 3-ethyl-5-methyl phenol or a di- or triphenol alkane e.g. diphenylol propane or methane or triphenylol propane or methane.

A proportion of dimethylol alkylphenol outside the indicated range tends to produce brittle products. The molar ratio of dimethylol alkylphenol to the methylol derivative of the polyfunctional phenol may be from 1:0.5 to 1:3 and is preferably from 1:0.6 to 1:2. Preferably at least 60% of the hydrogen atoms of the polyfunctional phenol, reactive to formaldehyde are substituted by methylol groups. The reactive hydrogen atoms that are substituted preferably occupy the o- and/or p-position. There are generally from 1.7:1 to 4:1 methylol groups of the derivative of the polyfunctional phenol to each mol of dimethylol alkylphenol. The particular ratio chosen will, of course, be partly dependent on the character of the components.

The methylol compounds can be present as such. In certain cases however, for example for reasons of compatibility or for matching the hardening rates, the methylol groups may be at least partially etherified with mono- or polyhydric aliphatic alcohols e.g. with up to 20 carbon atoms, for example with amyl, hexyl or octyl alcohol, ethylene glycol, glycerin or glycol ether. Preferably the etherifying alcohol is n- or isobutanol. The methylol compounds used should not contain large proportions of self-condensates since brittle products that may be susceptible to chemical attack e.g. by solvents, may be obtained. Minor proportion may be unavoidable in the preparation of the methylol compounds an such quantities do not give rise to undue problems.

Co-condensates may be obtained when two components randomly and uniformly alternate with one another. A mixture of the methylol compounds to be condensed may either be prepared in the usual manner or the individual methylol compounds may be separately prepared and then mixed with one another or they can be prepared successively in a reaction vessel. For example it is possible in a single reaction vessel to methylolate the alkyl phenol, then react the crosslinkable phenol to form the polymethylol compound and then subject the mixture to co-condensation accompanied by heating. Care must be taken during co-condensation to ensure that the methylol compounds used as the starting material are not homocondensates of 3, 4 or more monomers or the desired random distribution of the various monomer compounds in the co-condensate will not be achieved (cf Example 5). However, if one starts with precondensed methylol compounds comprising at least three or more monomeric methylol compounds co-condensates are obtained wherein the originally monomeric methylol compounds are distributed in blocks i.e. in a non-random manner due to the intermediate precondensation (cf comparison Example 5). Such co-condensates do not have the advantageous properties of the products obtained according to the invention.

During the preparation of the methylol compounds as well as during any etherification with alcohols the reasons conditions should be chosen so as to reduce or eliminate self-condensation. For example, the formation of methylol groups on the phenols is performed in the usual manner in the presence of large amounts of alkali, preferably 0.1 to 1.0 equivalents of sodium hydroxide (based on phenols) and advantageously at temperatures of from 0° to 80° C, preferably from 25° to 65° C.

Co-condensation can take place in the presence of a catalyst at from 70° to 150° C, preferably up to 130° C, and without catalyst at from 150° to 190° C. The catalyst may be an acid catalyst such as hydrochloric acid, sulphuric acid, phosphoric acid and their acid derivatives e.g. alkyl and aryl derivatives, phenol sulphonic acid and its chlorides. Co-condensation may also take place when the coatings are stoved or when laminated articles are produced by heating.

If desired, incomplete co-condensation of the methylol compounds can be performed following their preparation in one vessel. It requires no catalyst and can only take place by heating the components, if desired, with the addition of solvents such as aromatic hydrocarbons, alcohols or other polar solvents conveniently with the removal of the water formed during the condensation. The condensation of the co-condensates may be completed subsequently e.g. by stoving. The co-condensates can be prepared as a solid resin or as a resin solution with varying condensation levels, adjusted as required. The complete condensation can then take place after the products have been applied to a surface.

The condensates according to the invention harden at low temperatures and/or over short periods of time e.g. at 160° for from 5 to 10 minutes. Known (according to Houben-Weyl "Methods of organic chemistry", vol XIV 2, 1963, pp 281–285, examples 29, 30, 39 and 40) resols modified with butanol, alkyd resins, polymers and long-chained polyphenols are only hardened for 1–2 hours at 180° C. The hardening of the resins produced according to the invention requires no catalyst at elevated temperatures although acids can be added. In the presence of strong acids hardening may take place at room temperature.

Suitable entraining agents for use when distilling off the solvent for the condensation reaction are e.g. xylene, butanol, toluene, benzene and diethyl benzene.

A further advantage of the new resins is that by using certain techniques hardened products that are very light in colour are obtained. This applies in particular to mixed condensates of p-alkyl phenols with an alkyl chain of less than 6 carbon atoms and completely or extensively methylolate cross-linkage phenols e.g. polymethylol phenol with more than 2.5 methylol groups per molecule.

The miscibility of the methylol compounds and the mixed, condensed, uncured resins is significant. Whereas dimethylol phenols in which the alkyl group has more than 6 carbon atoms are not miscible with polymethylol phenol in any weight ratio and only yield a homogeneous resin by mixed condensation, dimethylol compounds of short-chained alkyl phenols dissolve very well in the polymethylol compounds. These systems dissolve not only in most polar solvents and aromatic hydrocarbons, but may also tolerate a considerable addition of water, even if the solvents used are immiscible or only partly miscible with water. For example solutions in n-butanol can be diluted with water, without water-insolubility occurring, even of the butanol.

Due to their compatibility with water the mixtures of methylol compounds prepared according to the invention can also be used as water-soluble or water-dilutable binders e.g. for surface coatings. In addition to the good solubility of resins display good compatibility with most conventional additives used in synthetic resin technology.

As a result of the rapid hardening reactions which can also be performed in the presence of elastomers, for example maleic based resins, oils and their salt solutions and esters, the new mixed condensates are admirably suited as moulding masses, lacquers and binders for paper, mineral fibres and textiles.

In order that the invention may be well understood the following Examples are given by way of illustration only.

EXAMPLES 1 TO 4

50 g of 30% aqueous formaldehyde are added to 94 g of phenol. The mixture is cooled to 25° C. While cooling 60 g of (33%) sodium hydroxide solution are added, followed by 53 g (90%) paraformaldehyde. The temperature is allowed to rise to 34° – 36° C at which point it is held for 30 minutes by cooling. The mixture is then stirred at 40° C until the formaldehyde content falls to from 0.5 to 0.7% over a period of about 4 hours. Then 135 g of isobutanol and 75 g of xylene are added and the pH is adjusted to 6.4 to 6.0 with about 40 g of 60% sulphuric acid while a temperature of 40° C is held by cooling. The aqueous phase is then separated and discarded. Subsequently distillation taken place with the addition of an entraining agent e.g. xylene under reduced pressure at 50°–55° C so that water liberated during the reaction is separated and the entraining agent is led back the reaction mixture. Any salts that may be separated are removed by subsequent filtration. 330 g of solution are obtained to which are added 210 g of dimethylol p-tert.butyl phenol, melting point 72°–74° C, prepared according to "Journal fur praktische Chemie", 2,153, 1939. This mixture corresponds to Example 2 of the following table.

The solution of dimethylol-p-tert.-butyl phenol and polymethylolphenol is pale yellow and has a viscosity of 210cp at 20° C. Analysis of the residue at 170° C reveals a solids content of 57%. The solution represents e.g. after dilution with isobutanol and water, a heat-hardening varnish for plates which, due to its excellent flexible properties, is able to withstand sudden deformation and possesses good chemical stability.

To demonstrate the effect of the molar ratio of the starting products on the properties of the hardening products the dimethylol-p-tert.butyl phenol content is varied. The mixing ratios can be seen from Table 1.

Table 1:

| | Change in the molar ratio of the starting materials | |
|---|---|---|
| Example No | molar ratio Dimethyl-p-tert-butyl phenol : phenol: $CH_2O$ | Quantity of Dimethylol phenol p-tert.butyl phenol in grams |
| | 1:0.95:1.9 | 221 |
| 2 | 1:1.0:2.0 | 210 |
| 3 | 1:1.1:2.2 | 191 |
| 4 | 1:1.3:2.6 | 162 |

By adding 5 g of ethylene glycol monoethyl ether and 20–40 g of water per 100 g of solution the four solutions may be set to a viscosity of 16 DIN seconds at 20° C. 0.31 mm thick galvanised steel sheets are varnished by immersing once in these varnish solutions. After a 10 minute drying period the sheets are stoved for 6 minutes at 180° C. After stoving the light gold coloured varnish layer has a thickness of 11μ.

Testing the films

On treating the varnished films of Examples 1 to 4 with a mixture of equal volume portions of xylene and ethylene glycol monoethyl ether it is observed that the surfaces are not corroded. Stoving these varnish films again at 190° C does not affect their characteristics.

On testing the deep impact resistance on the samples prepared in Examples 1 to 4 with the Niesen device ("Dyes, Varnishes, Coating Media," 1949, p. 10; a 2 Kg weight with a hemispherical tip of diameter 20 mm is dropped on the tightly stretched hollow-supported test sheet). The height of the fall of the hemisphere that can be withstood by the varnishes without detectable external damage is determined. Subsequently the mechanically loaded sheets are boiled for an hour in 2% acetic acid. The results are given in Table 2.

Table 2:

| | Deep impact resistance and acetic acid resistance | |
|---|---|---|
| Example No. | Height of fall (cm) | Effect of 2% acetic acid |
| 1 | 90 | Slight tarnishing |
| 2 | 90 | No corrosion |
| 3 | 90 | No corrosion |
| 4 | 60 | No corrosion |

As the test results show the films produced according to the invention have good resistance to acetic acid and good deep impact resistance.

EXAMPLE 5

Preparation of dimethylol nonyl phenol 220g of p-nonyl phenol, 50 g of aqueous (30%) formaldehyde and 50 g of (90%) paraformaldehyde are dissolved or suspended accompanied by stirring at 40° C and over a period of half an hour 80 g of 33% caustic soda solution are added. The temperature rises to 60° C. This temperature is maintained initially by cooling then later by heating, until the free formaldehyde content drops to 1.8 – 2%, which takes 4–5 hours. 75g of xylene are then added, followed by cooling to 40° C and the pH is adjusted to 8.0 to 7.5 with about 105 g of 60% sulphuric acid. The temperature must be held at 40° C by cooling. Subsequently the pH is adjusted to from 6.4 to 6.6 with 2 to 3 g of 50% phosphoric acid. The solution is left to settle, separated and discarded. The dimethylol nonyl phenol solution, after adding xylene as the entraining agent, is freed of water by circulation distillation as described in Examples 1–4 under reduced pressure and at a tank temperature of 50°–60° C. Inorganic salts are removed by subsequent filtration. 390 g of the solution are obtained.

Preparation of dimethylol phenol 94 g of phenol are dissolved in 100 g of (33%) caustic soda solution and at 25° C 50 g of aqueous (30%) formaldehyde and 50 g of (90%) paraformaldehyde are added. The mixture initially heats slowly in an exothermic reaction. On reaching 40° C cooling takes place and this temperature is maintained until the formaldehyde content falls to below 1%, which takes 1½ to 2 hours. 100 g of isobutanol are added and accompanied by cooling the mixture is set to a pH value of 8.0 to 8.5 with about 80 g of 35% hydrochloric acid, subsequently the pH value is set to 6.5 with about 5 to 10 g of formic acid, the aqueous phase is left to settle and discarded. The dimethylol phenol solution in isobutanol is freed from water by circulation distillation as described in Examples 1–4 under reduced pressure at 50°–55° C. Inorganic substances are removed by filtration and 240 g of the solution are obtained.

Co-condensation 300 g of dimethylol nonyl phenol solution and 210 g of the dimethylol phenol solution are combined and the mixture circulation distilled at normal pressure. After starting the circulation 15.3 ml of water are separated over a period of 1 hour as the temperature of the reacting mixture rises to 115° C. Cooling takes place and 460 g of a solution of the co-condensate of dimethylol phenyl and dimethylol nonyl phenol are obtained. Properties: viscosity at 20° C 1600 cP, solids content 62% (1 g of resin solution dried for 1 hour at 170° C).

100 g of the resin solution with 80 parts of diethyl benzene and 35 g of isobutanol are adjusted to a viscosity of 17 DIN seconds (20° C) and 0.31 mm thick galvanised steel sheets are varnished with this solution by a single immersion. After a 10 minute drying period and stoving at 170° C a light gold varnish coating having a thickness of 14μ is obtained. The deep impact strength test reveals a resistance at a height of fall of 90 cm. The shaped varnish films are resistant for 2 hours to boiling with 2% acetic acid.

COMPARATIVE TEST TO EXAMPLE 5

Co-condensation of precondensed dimethylol nonyl phenol and dimethylol phenol 300 g of the dimethylol nonyl phenol solution of Example 5 are circulation heated at a tank temperature of 95°–105° C until 3.5 ml of water have been separated. Similarly 210 g of the dimethylol phenol solution of Example 5 are precondensed. Subsequently both solutions of the separately prepared homocondensates are combined and circulation distilled until a further 8.3 ml of water have been separated. 470 g of a resin solution are obtained. Properties: viscosity at 20° C 1300 cP; solids content 63%. After diluting 100 g of this solution with 80 parts of xylene and 35 parts of isobutanol a dipping varnish with a viscosity of 14 DIN seconds is obtained. 0.31 mm thick steel sheets are dip varnished and stoved as in Example 5. The 10μ thick film is brittle, susceptible to solvents and is destroyed in a few minutes after treatment with boiling 2% acetic acid. It is thus seen that when a mixture of homocondensates is used a coating with inadequate properties is obtained.

EXAMPLE 6

123 g of 2,4,6-trimethylol phenol ("Angewandte Chemie", vol. 64 p. 399) are gradually dissolved in 60 g of water and 40 g of isobutanol at 40° C. At the same temperature 225 g of 2,6-dimethylol-p-tert.-butyl phenol (Journal fur praktische Chemie, 2, 153, 1939) are added and a viscous solution having a viscosity of 6000 cP at 20° C is obtained. It can be diluted further with water or polar solvents and used as a binder for laminates. Co-condensation takes place when preparing the laminates in a single phase by heating for 20 minutes at 170° C under pressure of 80 atm.

EXAMPLE 7

Preparation of dimethylol-p-cresol 216 g of p-cresol are melted, 200 g of aqueous (30%) formaldehyde and 66 g of (91%) paraformaldehyde introduced, followed by cooling to 35° C and the introduction over a period of 1 hour of 120 g of 33% caustic soda solution. It is to be taken care that the temperature of the exothermic reaction does not exceed 40° C and the mixture stirred for 4½ hours at 40° C. The free formaldehyde content is then 0.8%.

Methylolation of phenol 218 g of a mixture of 86 parts of phenol and 14 parts of aqueous (30%) formaldehyde are blended and stirred as 200 g of aqueous (30%) formaldehyde, 60 g of (91%) paraformaldehyde and, at 25° C, 120 g of (33%) caustic soda solution are added. The exothermic reaction occurring on adding caustic soda solution is stopped at 35° C. The mixture is stirred for 1 hour at 35° C then the temperature allowed to rise to 40° C and stirring is continued until the free formaldehyde content has dropped below 1%, which takes about 3 hours.

Co-condensation

Both solutions are combined, 100 ml of isobutanol added, the combined mixture is neutralised with about 150 g of 50% sulphuric acid (pH 7.2 to 7.8) and then a pH value of 6.4 to 6.6 is set with some dilute phosphoric acid. During neutralisation the temperature must be about 40° C. The aqueous phase is left to settle, separated and discarded.

As the dimethylol-p-cresol crystallises out from the resin phase on cooling, the mixture is circulation distilled after adding 10 g of toluene at 120° C, until the viscosity has reached 600–800 cP/20° and no dimethylol-p-cresol crystallises out from a sample. The resin solution is freed from the inorganic residues by hot filtration. The solution, of which 570 g are obtained, has a viscosity of 600°–800° cP/20° C and a residue of 73% after drying for 1 hour at 170° C.

23 mm thick tinned steel sheets were roller-varnished with the resin solution. After stoving for 12 minutes at 170° C an 8$\mu$ thick varnish film is obtained. Testing the deep impact resistance (see Example 1) gives resistance at a height of fall of 90 cm. The shaped varnish films are resistant to boiling for 2 hours with 2% acetic acid.

Comparative Example

Examples 1, 2 and 3 of U.S. Pat. No. 3,277,686 were repeated whereby phenol, a p-alkyl phenol and formaldehyde were condensed in the presence of triethylamine or hydrochloric acid at elevated temperature, the resins were diluted with butanol, applied to tinned steel sheets (0.31 mm thick) by immersing once and stoved at 190° C. The thickness of the stoved films was set to 11$\mu$ and 14$\mu$.

In the depth impact resistance test the varnishes withstood a height of fall of max. 30cm in the case of 11$\mu$ thick films and about 20 cm for 14$\mu$ thick films.

Table

| U.S.P. 3,227,686 | Stoving time (min) | Height of fall in cm 11$\mu$ (film) | 14$\mu$ (film) |
|---|---|---|---|
| Example 1 | 8 | 25 | 15 |
|  | 12 | 30 | 20 |
|  | 16 | 25 | 20 |
| Example 2 | 8 | 20 | 10 |
|  | 12 | 20 | 10 |
|  | 16 | 20 | 10 |
| Example 3 | 8 | 10 | 5 |
|  | 12 | 12 | 5 |
|  | 16 | 10 | 5 |

Comparison of the films according to the known process and those of Examples 1 to 5 of the invention shows that both the varnish films of the co-condensates of dimethylol butyl phenol and dimethylol phenol with a coating thickness of 11$\mu$ and those of dimethylol nonyl phenol and dimethylol phenol with a coating thickness of 14$\mu$ can withstand a height of fall of 90 cm. They are therefore superior to the known films regarding their deep impact resistance.

EXAMPLE 8

Preparation of dimethylol butyl phenol 750 g of p.-tert-butyl phenol, 300 g of xylene, 250 g of aqueous (30%) formaldehyde and 250 g of paraformaldehyde are dissolved or suspended at 40° C accompanied by stirring and thereto 300 g of (33%) caustic soda solution are added within 30 minutes. The temperature rises thereby to 60° C, which is maintained initially by cooling, then by heating until the free formaldehyde content has dropped to 1.6 to 1.8%., which requires 2½ to 3½ hours.

Methylolation of phenol

The mixture is cooled to 40° C, 470 g of phenol is added thereto, together with 665 g of (90%) paraformaldehyde, following by stirring for 1 hour at 40° C. Then over a period of 1 hour 300 g of (33%) caustic soda solution are added and the temperature is held at 40° C until the free formaldehyde content is below 1.5%. This lasts a further 3 to 4 hours, calculated from the paraformaldehyde addition.

Co-condensation

By adding about 820 g of dilute (60%) sulphuric acid, the mixture is adjusted to a pH value of 6.4 to 6.6. The temperature must be held at 40° C by cooling. The aqueous phase is left to settle separated and discarded. 700 g of xylene are added to the organic phase the dissolved water removed by vacuum distillation and the inorganic salts by filtration with return of the xylene.

The xylene is distilled off from the solution under reduced pressure and the mixture held at a temperature of 105° C until the melting point has risen to 60°–65° C. The resin is then emptied into a pan. 1480 g of product are obtained, melting point 64° C. 40 g of the co-condensate obtained are dissolved in 60 g of ethylene glycol monoethyl ether and the solution is rolled to a film on 6$\mu$ thick tinned steel sheet. After a 10 minute drying time the sheets are stoved for 25 minutes at 180° C. A flexible, light-coloured coating is obtained, for example suitable for varnishes for tins. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

We we claim is:

1. A process for the preparation of a flexible phenolic resin which comprises randomly and substantially alternately co-condensing A) a dimethylol derivative of a mononuclear monohydric alkylphenol, being substituted by one or two alkyl groups having from 1 to 20 carbon atoms, with B) a methylol derivative of a polyfunctional mono- to trihydric, mono- to trinuclear phenol having at least 3 functional groups in ortho- and para-position in which derivative at least half of the reactive hydrogen atoms in the polyfunctional phenol are substituted by methylol groups and wherein the ratio of the methylol groups of the derivative of the polyfunctional phenol compound B) in said resin per mol of the dimethylolalkyl phenol compound A) in said resin is from 1.4:1 to 6:1

2. The process of claim 1 wherein the methylol groups of at least one of A) the dimethylolalkyl phenol having an alkyl group of up to 6 carbon atoms and B) the methylol derivative of the polyfunctional phenol having at least 2.5 methylol groups are at least partially etherified with a mono- or polyhydric aliphatic alcohol having up to 20 carbon atoms.

3. The process of claim 1 wherein the methylol compounds A) and B) have been obtained in one vessel by methylolization of said alkyl phenol and subsequently by methylolating said polyfunctional phenol and the subjecting the mixture to a co-condensation.

4. The process of claim 1 wherein in the methylol derivative B) the phenol group is a reaction product of formaldehyde and phenol in the presence of 0.1 to 1 equivalent, based upon the phenol compound, of an alkali metal hydroxide.

5. The process of claim 1 wherein in the methylol derivative B) the phenol group has been obtained at a temperature of from 0° to 80° C.

6. The process of claim 1 wherein at least 60% of the hydrogen atoms in the polyfunctional phenols reactive to formaldehyde are substituted by methylol groups.

7. The process of claim 1 wherein the dimethylolalkyl phenol is condensed with the methylol derivative of the polyfunctional phenol in a molar proportion of 1:0.5 to 1:3.

8. The process of claim 1 wherein the methylol compounds are obtained by separately methylolating an alkyl phenol and a polyfunctional phenol and both methylol compounds are subsequently subjected to a co-condensation.

9. The process of claim 1 wherein the co-condensation of the methylol compounds is performed by heating the components at a temperature of from 70° to 190° C and in the presence of a solvent.

10. A coating composition containing a mixture of A) a dimethylol derivative of a mononuclear, monohydric alkylphenol, being substituted by one or two alkyl groups having from 1 to 20 carbon atoms, with B) a methylol derivative of a polyfunctional mono- to trihydric, mono- to trinuclear phenol having at least 3 functional groups in ortho- and para-position in which derivative at least half of the reactive hydrogen atoms in the polyfunctional phenol are substituted by methylol groups and wherein the ratio of the methylol groups of the derivative of the polyfunctional phenol in said mixture per mol of the dimethylolalkyl phenol in said mixture is from 1.4:1 to 6:1.

11. The composition of claim 10 which also contains an organic solvent or water as a solvent.

12. A flexible phenolic resin comprising randomly substantially alternately arranged co-condensed A) dimethylol phenol monomers of a mononuclear, monohydric alkylphenol having one or two alkyl groups having from 1 to 20 carbon atoms and B) methylol monomers of a polyfunctional mono- to trihydric, mono- to trinuclear phenol having at least 3 functional groups in ortho- and para-position in which functional groups at least half of the reactive hydrogen atoms in the polyfunctional phenol are substituted by methylol groups, in which the ratio of the methylol groups of the polyfunctional phenol in the resin per mol of dimethylolalkyl phenol in the resin is from 1.4:1 to 6:1 and the respective monomers are randomly substantially alternately arranged in said resin so that said resin contains at most minor amounts of self-condensated monomers 13. An article coated with the phenolic resin of claim 12.

* * * * *